(12) United States Patent
Haruna et al.

(10) Patent No.: US 11,491,576 B2
(45) Date of Patent: Nov. 8, 2022

(54) REFILL FRICTION STIR SPOT WELDING METHOD, PRESSING TOOL SET, AND REFILL FRICTION STIR SPOT WELDING DEVICE

(71) Applicant: KAWASAKI JUKOGYO KABUSHIKI KAISHA, Kobe (JP)

(72) Inventors: Shunsuke Haruna, Kakamigahara (JP); Shintaro Fukada, Kobe (JP); Takashi Ninomiya, Kakamigahara (JP); Etsuko Yamada, Ichinomiya (JP); Masaaki Hirano, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 165 days.

(21) Appl. No.: 16/645,706

(22) PCT Filed: Sep. 3, 2018

(86) PCT No.: PCT/JP2018/032549
§ 371 (c)(1),
(2) Date: Mar. 9, 2020

(87) PCT Pub. No.: WO2019/049813
PCT Pub. Date: Mar. 14, 2019

(65) Prior Publication Data
US 2020/0276666 A1   Sep. 3, 2020

(30) Foreign Application Priority Data
Sep. 8, 2017 (JP) .............................. JP2017-172970

(51) Int. Cl.
*B23K 20/00* (2006.01)
*B23K 20/12* (2006.01)

(52) U.S. Cl.
CPC ........ *B23K 20/1225* (2013.01); *B23K 20/002* (2013.01); *B23K 20/127* (2013.01); *B23K 20/1255* (2013.01); *B23K 20/1265* (2013.01)

(58) Field of Classification Search
CPC ............ B23K 20/1265; B23K 20/1255; B23K 20/125; B23K 20/122; B23K 20/123; B23K 20/126; B23K 20/127
See application file for complete search history.

(56) References Cited

U.S. PATENT DOCUMENTS 10,065,362 B2 * 9/2018 Ueno ................... B29C 66/324
11,027,363 B2 * 6/2021 Onose ............... B23K 20/1265
(Continued)

FOREIGN PATENT DOCUMENTS

EP  2 687 314 A1  1/2014
EP  3 210 711 A1  8/2017
(Continued)

*Primary Examiner* — Erin B Saad
(74) *Attorney, Agent, or Firm* — Oliff PLC

(57) ABSTRACT

A friction stir spot welding method includes a welding step of performing friction stir spot welding of a workpiece by using a pin member and a shoulder member while the workpiece is supported and pressed by the end face of a clamp member and a pressing step of causing a friction stir spot welding device to press an obverse surface and a reverse surface of at least one of a friction-stirred region of the workpiece and an adjacent region adjacent to the friction-stirred region of the workpiece from a rotary tool side and an opposite side after the welding step while the pin member and the shoulder member are accommodated in an accommodation space of the clamp member.

12 Claims, 10 Drawing Sheets

(56) References Cited

U.S. PATENT DOCUMENTS

| | | | |
|---|---|---|---|
| 11,045,898 B2* | 6/2021 | Haruna | B23K 20/1255 |
| 11,084,121 B2* | 8/2021 | Hirano | B23K 20/126 |
| 2009/0120995 A1* | 5/2009 | Hallinan | B29C 66/836 |
| | | | 228/2.3 |
| 2009/0308913 A1* | 12/2009 | Hall | B23K 20/126 |
| | | | 228/112.1 |
| 2010/0038832 A1* | 2/2010 | Rosal | B23K 20/1255 |
| | | | 266/46 |
| 2010/0084456 A1* | 4/2010 | Carter | B23K 20/126 |
| | | | 228/112.1 |
| 2012/0279271 A1* | 11/2012 | Carter | H05B 6/101 |
| | | | 72/342.8 |
| 2014/0069986 A1 | 3/2014 | Okada et al. | |
| 2015/0183054 A1* | 7/2015 | Okada | B23K 20/1255 |
| | | | 228/2.1 |
| 2017/0341176 A1 | 11/2017 | Okada et al. | |

FOREIGN PATENT DOCUMENTS

| | | |
|---|---|---|
| JP | 2007-029981 A | 2/2007 |
| JP | 2012-196682 A | 10/2012 |
| JP | 2015-180513 A | 10/2015 |
| KR | 10-2009-0066432 A | 6/2009 |
| WO | 2016/098341 A1 | 6/2016 |

* cited by examiner

[FIG. 1]
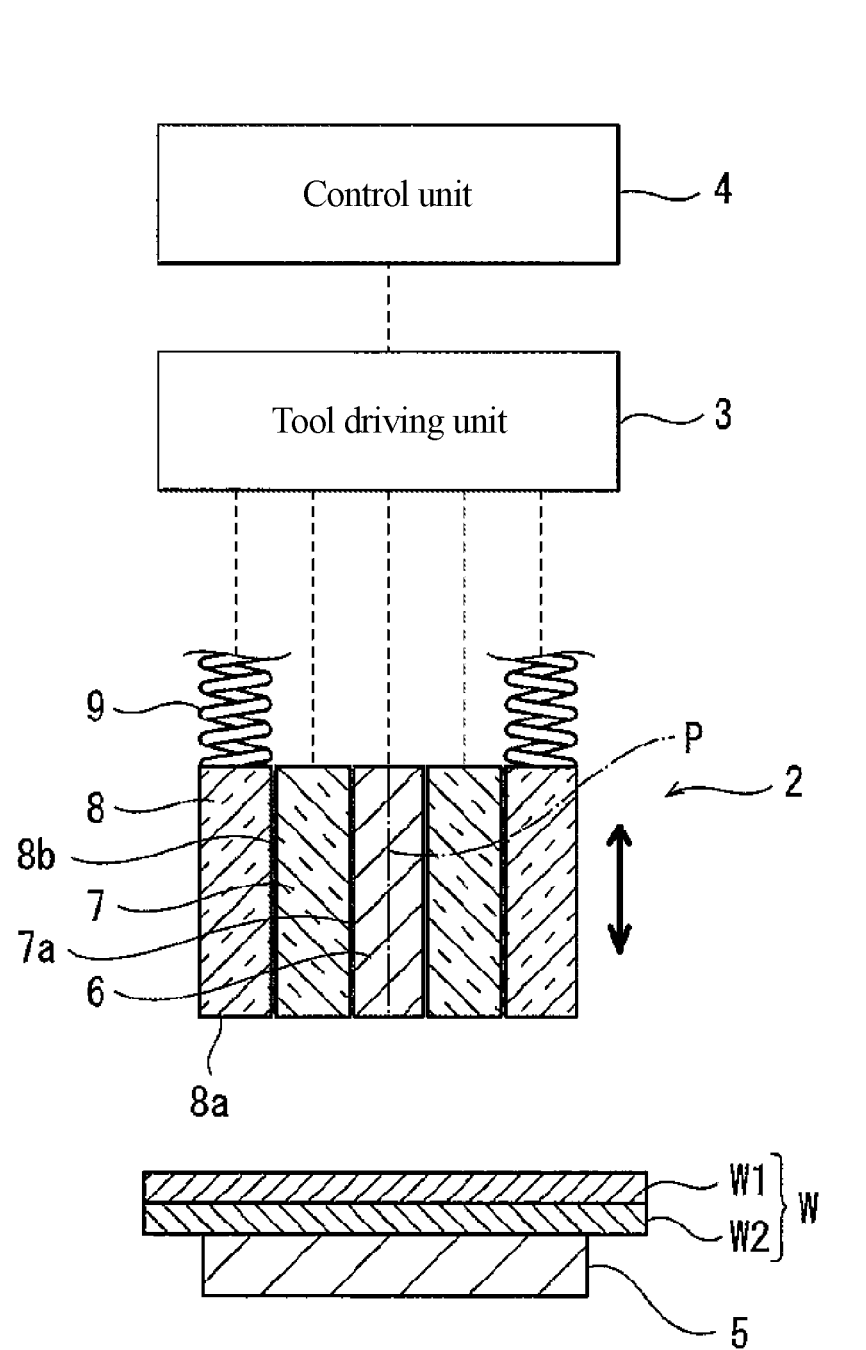

[FIG. 2]
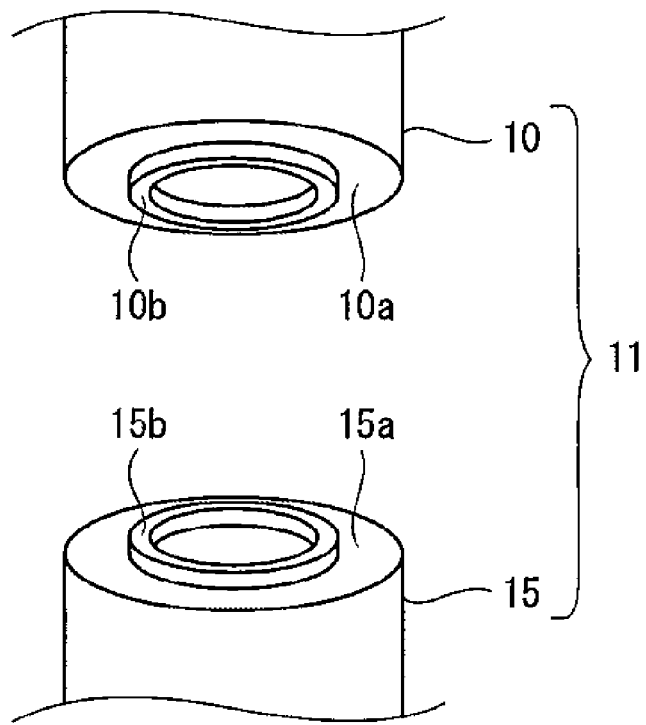
[FIG. 3]
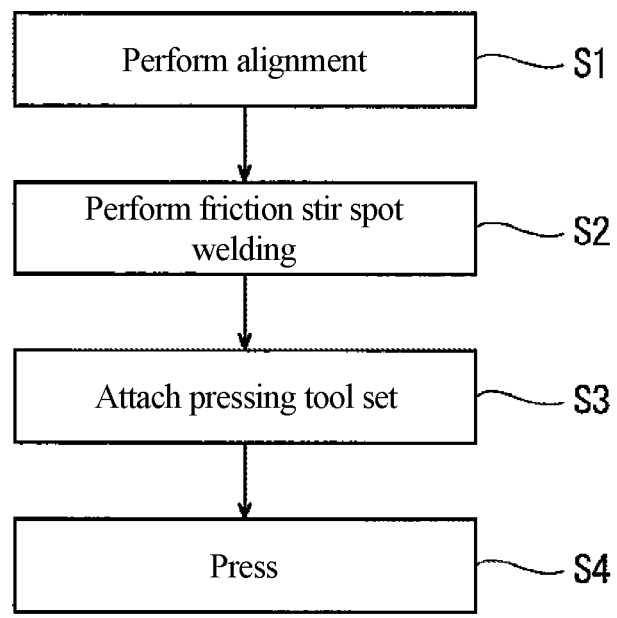

[FIG. 4]
(a)
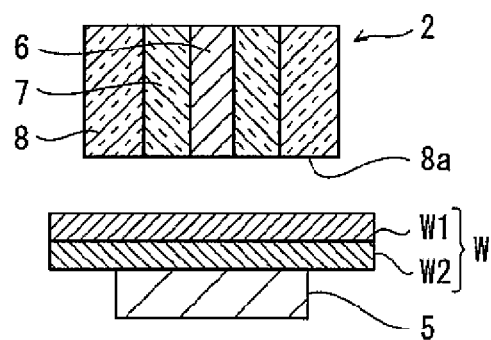
(d)
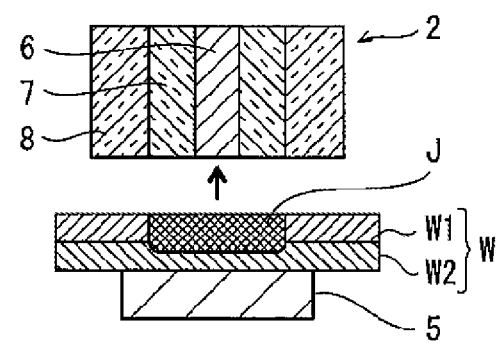
(b)
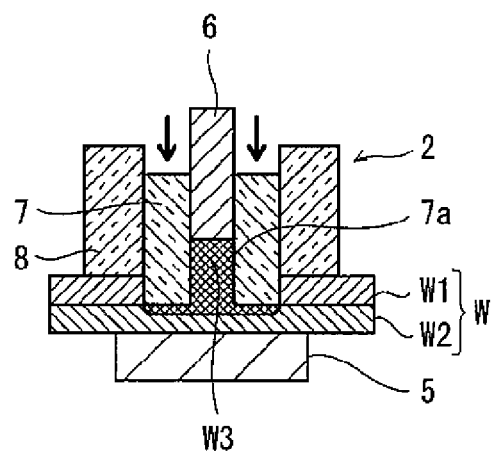
(e)
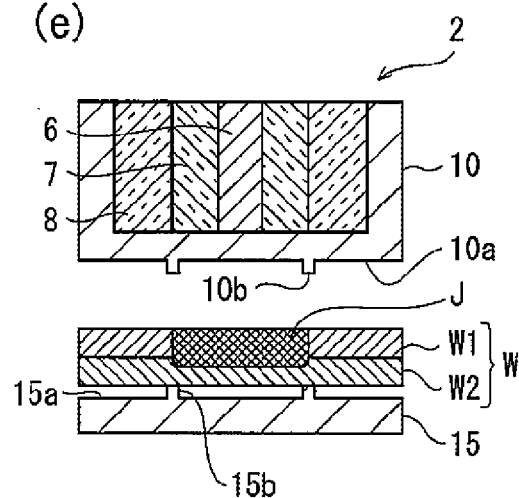
(c)
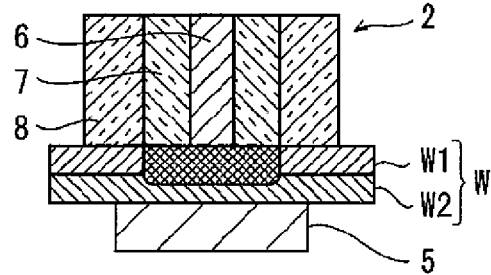
(f)
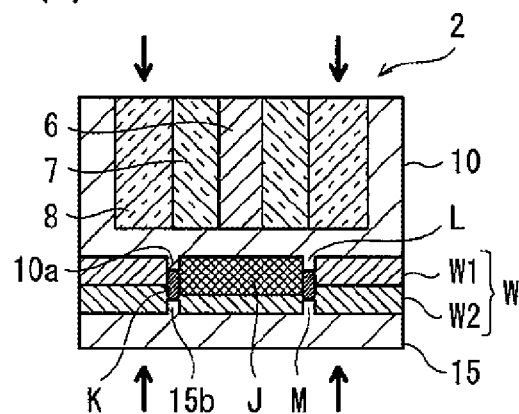

[FIG. 5]
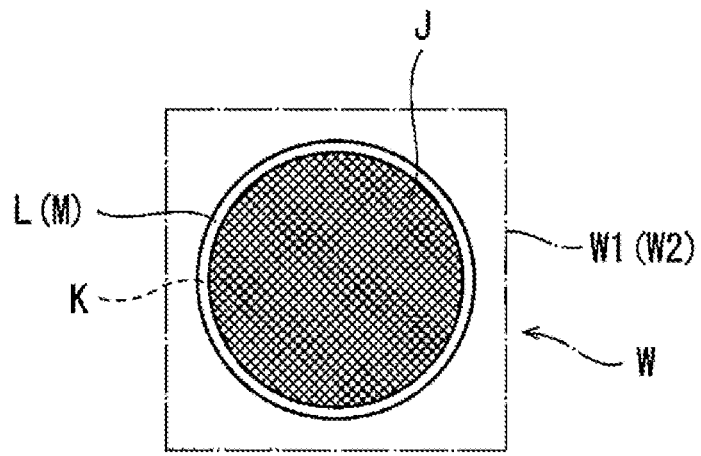
[FIG. 6]
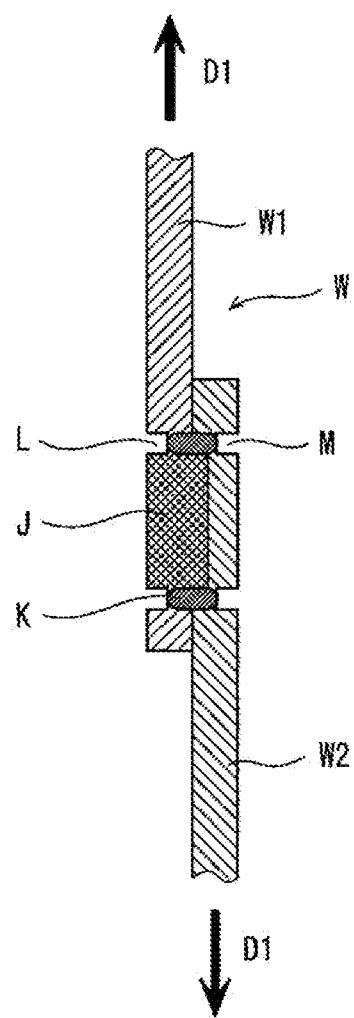

[FIG. 7]
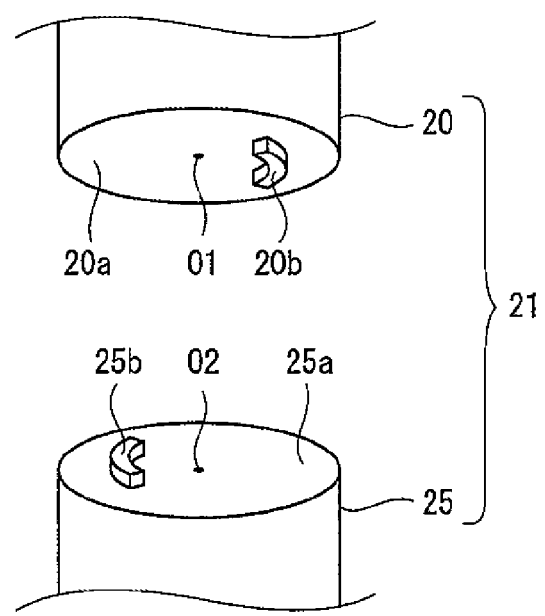

[FIG. 8]
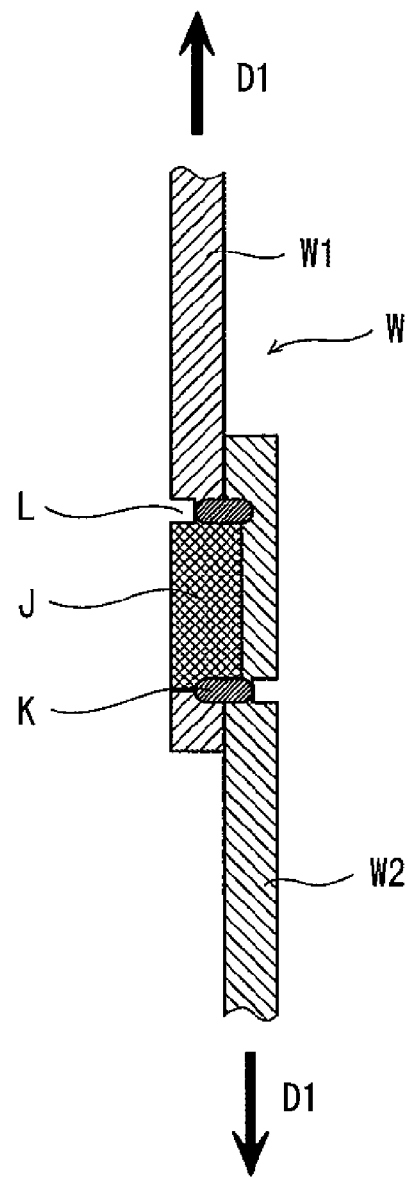

[FIG. 9]
(a) 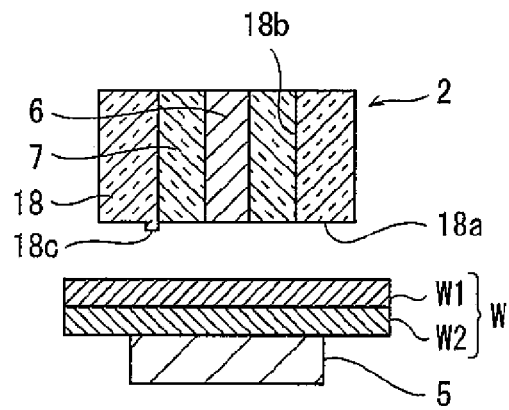
(d) 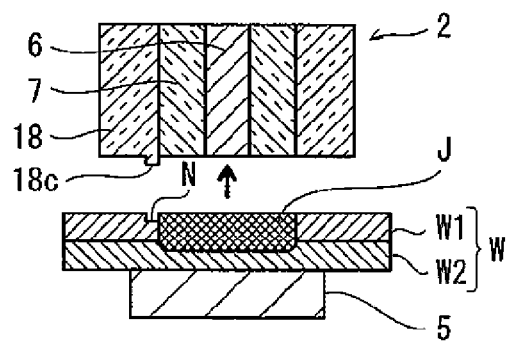
(b) 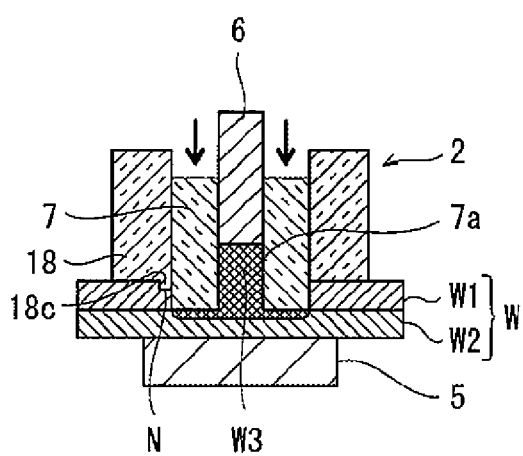
(e) 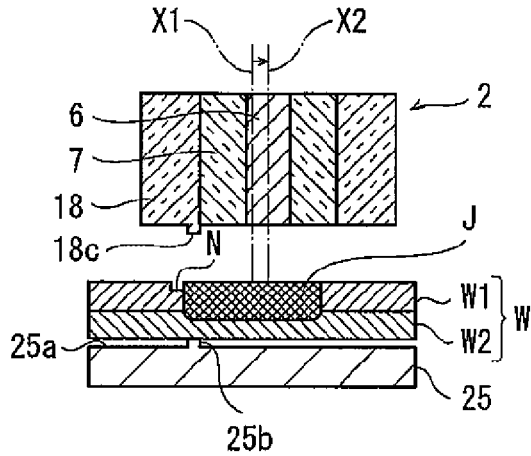
(c) 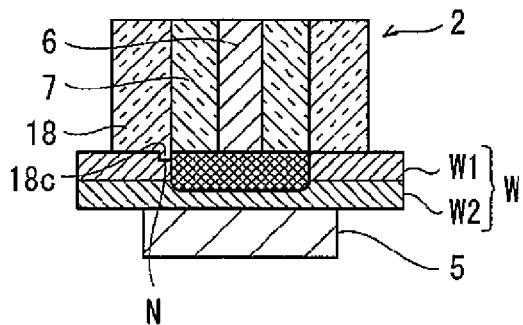
(f) 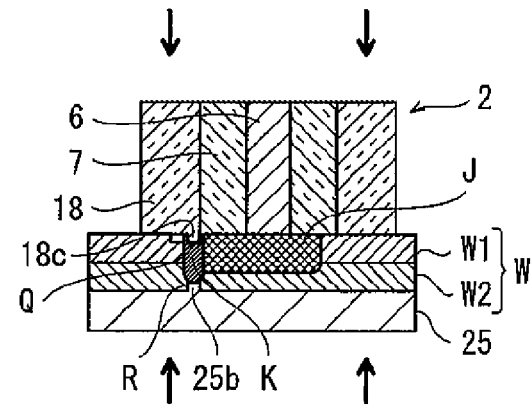

[FIG. 10]
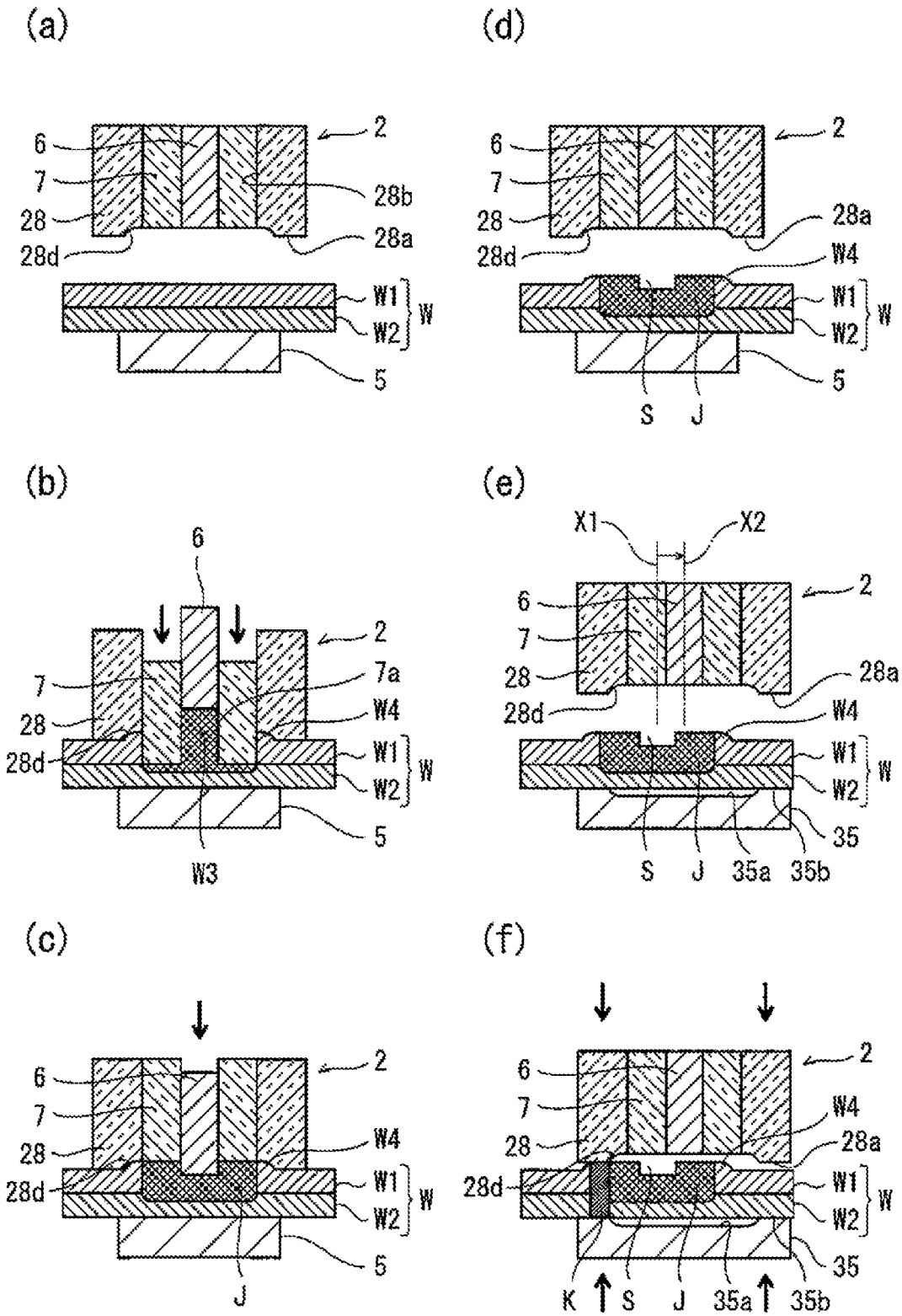

[FIG. 11]
(a)
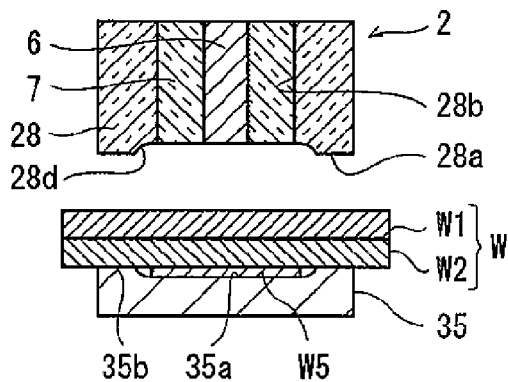
(d)
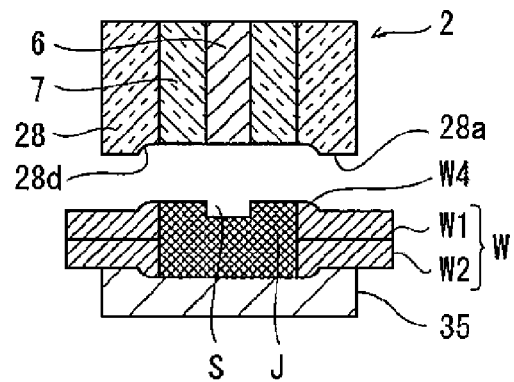
(b)
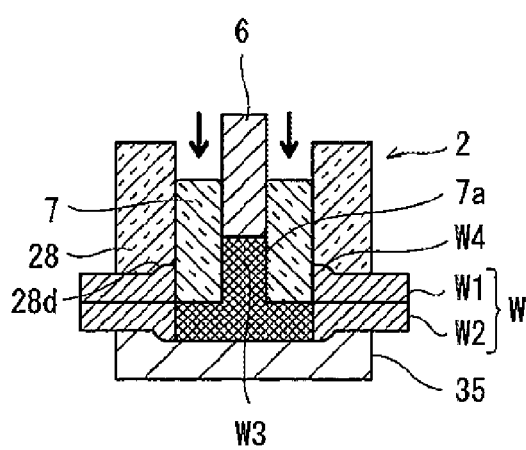
(e)
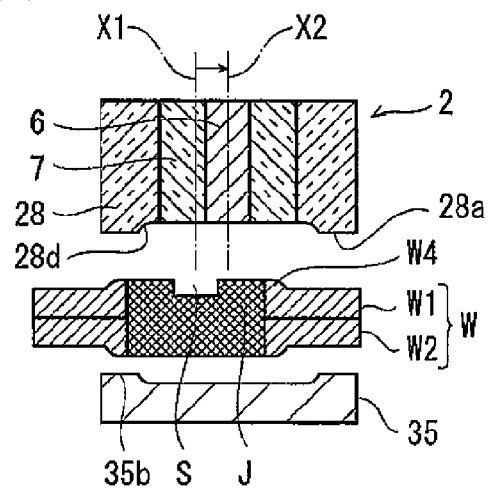
(c)
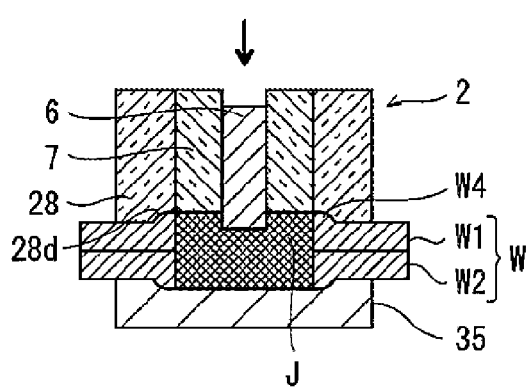
(f)
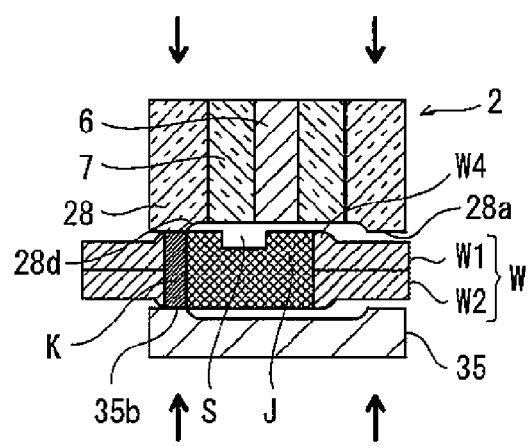

[FIG. 12]
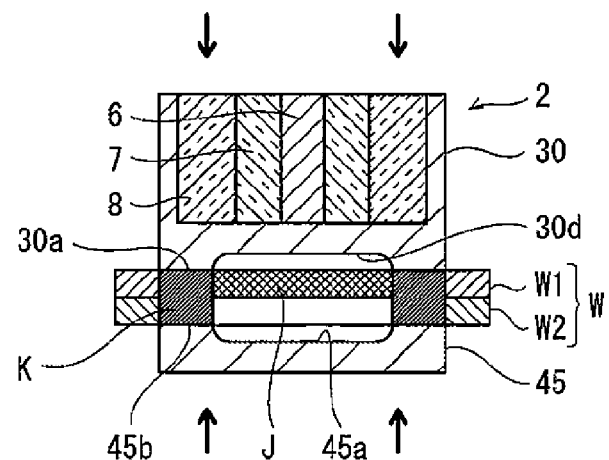

REFILL FRICTION STIR SPOT WELDING METHOD, PRESSING TOOL SET, AND REFILL FRICTION STIR SPOT WELDING DEVICE

TECHNICAL FIELD

The present invention relates to a technique for improving the fatigue strength of a joint portion formed by refill friction stir spot welding.

BACKGROUND ART

For example, as disclosed in PTL 1, there is known a refill friction stir spot welding device provided with a pin member and a shoulder member that can rotate around a predetermined axis independently of each other and advance and retract in the axial direction, and a clamp member that surrounds an outer periphery of the shoulder member and can advance and retract in the axial direction.

CITATION LIST

Patent Literature

PTL 1: JP 2012-196682A

SUMMARY OF INVENTION

Technical Problem

In welding a workpiece by friction stir spot welding, it is required to improve the fatigue strength of a joint portion. However, simply providing a process for improving such fatigue strength may reduce the manufacturing efficiency of a welded body.

The present invention has been made in view of this problem and aims at efficiently improving the fatigue strength of the joint portion of a workpiece formed by refill friction stir spot welding.

Solution to Problem

In order to solve the above problem, a friction stir spot welding method according to an aspect of the present invention is a friction stir spot welding method of welding a workpiece by friction stir spot welding using a friction stir spot welding device including a rotary tool that partially stirs the workpiece and a clamp member that presses the workpiece. The rotary tool includes a pin member that rotates around a predetermined axis and is provided so as to be able to advance and retract in a direction of the axis and a shoulder member that rotates around the axis while surrounding an outer periphery of the pin member and is provided so as to be able to advance and retract in the direction of the axis independently of the pin member. The clamp member has an inner peripheral surface that forms an accommodation space for the pin member and the shoulder member so as to surround an outer periphery of the shoulder member and an annular end face configured to come into surface contact with the workpiece. The friction stir spot welding method includes a welding step of performing friction stir spot welding of the workpiece by using the pin member and the shoulder member while the workpiece is supported and pressed by the end face of the clamp member and a pressing step of causing the friction stir spot welding device to press an obverse surface and a reverse surface of at least one of a friction-stirred region of the workpiece and an adjacent region adjacent to the friction-stirred region of the workpiece from a rotary tool side and an opposite side to the rotary tool after the welding step while the pin member and the shoulder member are accommodated in the accommodation space.

The above method performs a pressing step of causing the friction stir spot welding device to press the obverse surface and the reverse surface of at least one of the friction-stirred region of the workpiece and the adjacent region adjacent to the friction-stirred region of the workpiece from the rotary tool side and its opposite side after the welding step. This makes it possible to press the obverse surface and the reverse surface of the workpiece from the both sides described above after friction stir spot welding of the workpiece. As a result, the workpiece can be compressed, and a residual stress can be properly applied to the joint portion of the workpiece. Accordingly, the fatigue strength of the joint portion of the workpiece can be improved.

Such pressing of the workpiece can be performed by using the friction stir spot welding device used for friction stir spot welding of the workpiece. In addition, when a plurality of friction stir spot welding operations are performed by a series of welding operations, the pressing operation can be performed accompanying this welding operations. Therefore, it is possible to efficiently perform the friction stir spot welding and pressing of the workpiece by a series of operations and to suppress a decrease in productivity of welded bodies due to the addition of a pressing process.

In the pressing step, a welding-side pressing tool having an end face capable of pressing the surface of the workpiece may be attached to the rotary tool so as to cover distal ends of the pin member and the shoulder member, and the end face of the welding-side pressing tool may press the surface of the workpiece. According to the above method, after the workpiece is welded by friction stir spot welding, the workpiece can be efficiently pressed by using the welding-side pressing tool having a relatively simple structure.

In the pressing step, a welding-side pressing tool having an end face capable of pressing the surface of the workpiece may be attached to the rotary tool so as to cover distal ends of the pin member and the shoulder member, and the welding-side pressing tool may have an end face placed to face the surface of the workpiece and a welding-side protruding portion that protrudes in the direction of the axis from the end face of the welding-side pressing tool, extends around the axis, and is placed to be able to press the surface of the workpiece. In the pressing step, the surface of the workpiece may be pressed by the welding-side protruding portion.

According to the above method, by using the welding-side protruding portion, a desired region of the surface of a workpiece can be efficiently pressed. Further, by pressing the workpiece by the welding-side protruding portion, the workpiece can be properly compressed with a relatively small pressing force because the pressing area can be reduced. For this reason, it is not necessary to prepare a dedicated device for pressing the workpiece. Therefore, the cost and work load for improving the fatigue strength of the joint portion can be reduced, and the fatigue strength of the joint portion can be improved efficiently.

In the pressing step, the surface of the workpiece may be pressed by the end face of the clamp member. This makes it possible to efficiently press the workpiece by using the clamp member.

The clamp member may have a clamp-side protruding portion that protrudes in the direction of the axis from the end face of the clamp member, extends around the axis, and is placed to be able to press the workpiece. In the pressing step, the surface of the workpiece may be pressed by the clamp-side protruding portion.

According to the above method, by using the clamp-side protruding portion, a desired region of the surface of a workpiece can be efficiently pressed. Further, by pressing the workpiece by the clamp-side protruding portion, the workpiece can be properly compressed with a relatively small pressing force because the pressing area can be reduced. Accordingly, it is not necessary to separately prepare a dedicated device for pressing the workpiece, and the cost and work load for improving the fatigue strength of the joint portion can be reduced.

In the pressing step, a backing-side pressing tool having an opposing surface that is placed on an opposite side of the workpiece to the rotary tool and faces the reverse surface of the workpiece and a backing-side protruding portion that protrudes in the direction of the axis from the opposing surface, extends around the axis, and is placed so as to be able to press the reverse surface of the workpiece may be used to press the reverse surface of the workpiece with the backing-side protruding portion.

Using the backing-side protruding portion makes it possible to efficiently suppress a desired region of the reverse surface of the workpiece from the backing-side pressing tool side of the workpiece. In addition, because the workpiece is pressed by the backing-side protruding portion, the pressing area can be reduced. Accordingly, the workpiece can be properly compressed even with a relatively small pressing force.

In the pressing step, the workpiece may be pressed such that pressing positions on the workpiece on the rotary tool side and the opposite side to the rotary tool overlap through the workpiece when viewed from the direction of the axis. This makes it possible to press the region where the pressing positions on the workpiece overlap when viewed from the direction of the axis from both sides of the workpiece in the direction of the axis, thereby improving the fatigue strength of the region.

A pressing tool set according to another aspect of the present invention is a pressing tool set that is provided for a friction stir spot welding device configured to partially stir and spot-weld a workpiece by using a rotary tool including a pin member that rotates around a predetermined axis and is provided so as to be able to advance and retract in a direction of the axis and a shoulder member that rotates around the axis while surrounding an outer periphery of the pin member and is provided so as to be able to advance and retract in the direction of the axis independently of the pin member, the pressing tool set being configured to press the workpiece having undergone friction stir spot welding. The pressing tool set includes a welding-side pressing tool that is attached to the rotary tool so as to cover distal ends of the pin member and the shoulder member and has an end face placed to face a surface of at least one of a friction-stirred region of the workpiece and an adjacent region adjacent to the friction-stirred region of the workpiece and a backing-side pressing tool that is placed on an opposite side of the workpiece to the rotary tool to support the workpiece and has an opposing surface placed to face a reverse surface of the workpiece.

The above configuration makes it possible to press the obverse surface and the reverse surface of at least one of the friction-stirred region of the workpiece and the adjacent region adjacent to the friction-stirred region of the workpiece from the rotary tool side and its opposite side by using the welding-side pressing tool attached to the rotary tool of the friction stir spot welding device and the backing-side pressing tool placed on the opposite side of the workpiece to the rotary tool. Such pressing of the workpiece can be efficiently performed by providing the friction stir spot welding device used for friction stir spot welding of the workpiece with the pressing tool set.

A pressing tool set according to another aspect of the present invention is a pressing tool set that is provided for a friction stir spot welding device configured to partially stir and spot-weld a workpiece by using a rotary tool including a pin member that rotates around a predetermined axis and is provided so as to be able to advance and retract in a direction of the axis and a shoulder member that rotates around the axis while surrounding an outer periphery of the pin member and is provided so as to be able to advance and retract in the direction of the axis independently of the pin member, the pressing tool set being configured to press the workpiece having undergone friction stir spot welding. The pressing tool set includes a clamp member having an inner peripheral surface that forms an accommodation space for the pin member and the shoulder member so as to surround an outer periphery of the shoulder member and an annular end face placed to face a surface of at least one of a friction-stirred region of the workpiece and an adjacent region adjacent to the friction-stirred region of the workpiece and a backing-side pressing tool that is placed on an opposite side of the workpiece to the rotary tool to support the workpiece and has an opposing surface placed to face a reverse surface of the workpiece.

The above configuration makes it possible to press the obverse surface and the reverse surface of at least one of the friction-stirred region of the workpiece and the adjacent region adjacent to the friction-stirred region of the workpiece from the rotary tool side and its opposite side by using the clamp member of the friction stir spot welding device and the backing-side pressing tool placed on the opposite side of the workpiece to the rotary tool. Such pressing of the workpiece can be performed by providing the friction stir spot welding device used for friction stir spot welding of the workpiece with the pressing tool set, and hence can be quickly performed.

The end face may have a first protruding portion protruding in the direction of the axis from the end face, extending around the axis, and placed to be able to press the obverse surface of the workpiece, and the opposing surface may have a second protruding portion protruding in the direction of the axis from the opposing surface, extending around the axis, and placed to be able to press the reverse surface of the workpiece.

According to the above configuration, desired regions of the obverse surface and the reverse surface of the workpiece can be efficiently pressed by using the first protruding portion disposed on the end face of the welding-side pressing tool or the clamp member and the second protruding portion disposed on the opposing surface of the backing-side pressing tool. In addition, because the pressing area can be reduced, the workpiece can be properly compressed with a relatively small pressing force. Accordingly, it is not necessary to separately prepare a dedicated device for pressing the workpiece, and the cost and work load for improving the fatigue strength of the joint portion can be reduced, thereby efficiently improving the fatigue strength of the joint portion.

A refill friction stir spot welding device according to another aspect of the present invention includes one of the pressing tool sets described above. This configuration makes it possible to press the surface of the workpiece from the both sides described above after friction stir spot welding of the workpiece. Accordingly, the workpiece can be compressed, and a residual stress can be properly applied to the joint portion of the workpiece. Accordingly, the fatigue strength of the joint portion of the workpiece can be improved.

Advantageous Effects of Invention

According to each aspect of the present invention, it is possible to efficiently improve the fatigue strength of the joint portion of a workpiece formed by refill friction stir spot welding.

BRIEF DESCRIPTION OF DRAWINGS

FIG. 1 is a view showing a configuration of a main part of a refill friction stir spot welding device according to a first embodiment.

FIG. 2 is a perspective view of a pressing tool set according to the first embodiment.

FIG. 3 is a flowchart showing a friction stir spot welding method according to the first embodiment.

FIGS. 4(a) to 4(f) are cross-sectional views for explaining the friction stir spot welding method according to the first embodiment.

FIG. 5 is a front view of the joint portion of a workpiece formed by the friction stir spot welding method according to the first embodiment.

FIG. 6 is a cross-sectional view showing a state when a tensile load is applied from both ends of the workpiece to the joint portion of the workpiece formed by the friction stir spot welding method according to the first embodiment.

FIG. 7 is a perspective view of a pressing tool set according to a second embodiment.

FIG. 8 is a cross-sectional view showing a state when a tensile load is applied from both ends of a workpiece to a joint portion of the workpiece formed by a friction stir spot welding method according to the second embodiment.

FIGS. 9(a) to 9(f) are cross-sectional views for explaining a friction stir spot welding method according to a third embodiment.

FIGS. 10(a) to 10(f) are cross-sectional views for explaining a friction stir spot welding method according to a fourth embodiment.

FIGS. 11(a) to 11(f) are cross-sectional views for explaining a friction stir spot welding method according to a fifth embodiment.

FIG. 12 is a cross-sectional view for explaining a friction stir spot welding method according to a sixth embodiment.

DESCRIPTION OF EMBODIMENTS

Each embodiment will be described below with reference to the accompanying drawings.

First Embodiment

FIG. 1 is a view showing a configuration of a main part of a refill friction stir spot welding device 1 according to the first embodiment. Referring to FIG. 1, a rotary tool 2 is shown in cross section, and the connection between the rotary tool 2 and a tool driving unit 3 is schematically indicated by the broken lines.

The device 1 performs friction stir spot welding of workpieces W (for example, a pair of workpieces (a first plate material W1 and a second plate material W2)). The device 1 includes the rotary tool 2, the tool driving unit 3, a control unit 4, a backing member 5, and a clamp member 8.

The tool driving unit 3 moves the rotary tool 2 to a plurality of predetermined positions and drives the rotary tool 2 to rotate. The control unit 4 controls the tool driving unit 3 so as to drive members 6 to 8 included in the rotary tool 2. The specific structure of the tool driving unit 3 is not limited, and for example, a known structure can be used.

The control unit 4 is, for example, a computer including a CPU, a ROM, and a RAM, and controls the operation of the tool driving unit 3. A predetermined control program is stored in the ROM, and setting information input by an operator is stored in the RAM. The setting information includes, for example, information on each plate thickness value of the plate materials W1 and W2 and information on each welding position. The backing member 5 is disposed on the opposite side of the workpiece W to the rotary tool 2 to support the workpiece W. A part of the backing member 5 faces the rotary tool 2 through the workpiece W.

The rotary tool 2 partially stirs the workpiece W. In the device 1 according to the present embodiment, the workpiece W supported by the backing member 5 is partially stirred by the rotary tool 2 from the opposite side to the side on which the workpiece W is supported. The rotary tool 2 includes the pin member 6 and the shoulder member 7. The rotary tool 2 has a nested structure in which the shoulder member 7 is disposed outside the pin member 6 and the clamp member 8 is disposed outside the shoulder member 7.

The pin member 6 is provided so as to rotate around a predetermined axis P and to advance and retract in the axis P direction. The pin member 6 of this embodiment is formed in a columnar shape extending in the axis P direction. The rear end portion of the pin member 6 in the axis P direction (the end portion of the pin member 6 which is located on the opposite side to the workpiece W) is supported by a fixing portion (not shown) of the tool driving unit 3.

The shoulder member 7 is provided around the outer periphery of the pin member 6 so as to rotate around the axis P and to be able to advance and retract in the axis P direction independently of the pin member 6. The shoulder member 7 has a hollow portion 7a, and the pin member 6 is inserted into the hollow portion 7a of the shoulder member 7.

In the rotary tool 2 of the present embodiment, the pin member 6 and the shoulder member 7 are provided so as to independently rotate around the axis P and advance and retract in the axis P direction while the pin member 6 is inserted into the hollow portion 7a of the shoulder member 7. The shoulder member 7 is formed in a columnar shape extending in the axis P direction.

The clamp member 8 is provided so as to surround the outer periphery of the shoulder member 7. The clamp member 8 is provided independently of the pin member 6 and the shoulder member 7 so as to be able to advance and retract in the axis P direction.

The clamp member 8 is a cylindrical member and has an end face 8a and an inner peripheral surface 8b. The inner peripheral surface 8b surrounds the outer periphery of the shoulder member 7 to form an accommodation space for the shoulder member 7 (to be simply referred to as an accommodation space hereinafter).

The end face (abutment surface) 8a has an annular shape, and is placed to face the surface of the workpiece W (the first plate material W1 in this case). The end face 8a is placed so as to be in surface contact with the surface of the workpiece W. The end face 8a extends parallel to a plane perpendicular to the axis P direction.

When the workpiece W is not subjected to friction stir spot welding, the shoulder member 7 is accommodated in the accommodation space with the outer periphery of the shoulder member 7 surrounded. The inner peripheral surface 8b that forms the accommodation space extends in the axis P direction inside the clamp member 8. The pin member 6 is also accommodated in the accommodation space independently of the shoulder member 7. When the pin member 6 and the shoulder member 7 are accommodated in the accommodation space, the opening of the accommodation space is closed by the pin member 6 and the shoulder member 7. When the workpiece W is subjected to friction stir spot welding, the pin member 6 and the shoulder member 7 extend from the accommodation space to the workpiece W side.

A spring 9 for applying a biasing force to the clamp member 8 toward the workpiece W in the axis P direction is disposed at the rear end portion of the clamp member 8 in the axis P direction. The clamp member 8 presses the workpiece W supported by the backing member 5 in the axis P direction by the urging force from the spring 9. When the clamp member 8 is retracted from the workpiece W, the clamp member 8 is pulled up by the tool driving unit 3 and retracted from the workpiece W.

The device 1 may have, for example, a C-shaped frame structure. In this case, the rotary tool 2, the tool driving unit 3, the control unit 4, and the clamp member 8 may be disposed at the upper part of the device 1, and the backing member 5 may be disposed at the lower part of the device 1. The device 1 may be attached to, for example, an articulated robot. In addition, in the device 1, the rotary tool 2, the tool driving unit 3, the control unit 4, and the clamp member 8 may be attached to the articulated robot, and the backing member 5 may be attached to another component (positioner or the like) different from the articulated robot.

FIG. 2 is a perspective view of a pressing tool set 11 according to the first embodiment. The pressing tool set 11 is provided in the device 1 and is used by the device 1 to press the workpiece W subjected to friction stir spot welding.

As shown in FIG. 2, the pressing tool set 11 has a welding-side pressing tool 10 and a backing-side pressing tool 15. The welding-side pressing tool 10 is attached to the rotary tool 2. The welding-side pressing tool 10 according to the present embodiment is attached to the rotary tool 2 so as to cover the distal ends of the pin member 6 and the shoulder member 7. For example, the welding-side pressing tool 10 is attached to the rotary tool 2 so as to cover the distal ends of the pin member 6, the shoulder member 7, and the clamp member 8 and the outer periphery of the clamp member 8.

The welding-side pressing tool 10 has a columnar shape having an end face 10a and a welding-side protruding portion 10b. The end face 10a is placed to face the surface of the workpiece W (the plate surface of the first plate material W1 in this case). The protruding portion 10b protrudes from the end face 10a in the axis P direction, extends around the axis P, and is placed so as to be able to press the surface of the workpiece W. When the welding-side pressing tool 10 is attached to the rotary tool 2, the protruding portion 10b protrudes from the end face 10a in the axis P direction. The protruding portion 10b is an indenter that presses the workpiece W that has been subjected to friction stir spot welding. The protruding portion 10b is disposed so as to be able to press the workpiece W that has been subjected to friction stir spot welding in the axis P direction.

The protruding portion 10b has a shape for applying compressive plastic strain to the welding interface, which is the load transmitting portion of the workpiece W, within the load output range required for a welding step in a normal friction stir spot welding device. Thus, the device 1 includes a compression processing mechanism for the workpiece W.

Specifically, the region other than the protruding portion 10b of the end face 10a is formed flat. The protruding portion 10b is formed in an annular shape extending in the circumferential direction of the end face 10a when viewed in the axis P direction. For example, the width and height (in the axis P direction) of the protruding portion 10b are constant. Further, a cross section of the protruding portion 10b which is perpendicular to the longitudinal direction is rectangular.

The height (in the axis P direction) of the protruding portion 10b can be set as appropriate. When the workpiece W is a pair of plate materials W1 and W2, the height dimension of the protruding portion 10b can be set to, for example, a value smaller than the plate thickness dimension of the plate material W1.

At least one of the width dimension and the height dimension of the protruding portion 10b may differ at a plurality of positions on the protruding portion 10b. Further, a cross section of the protruding portion 10b which is perpendicular to the longitudinal direction is not limited to a rectangular shape, and may be, for example, a parabolic shape that is convex toward the workpiece W.

The backing-side pressing tool 15 is arranged on the opposite side of the workpiece W from the rotary tool 2 side, and supports the workpiece W. The backing-side pressing tool 15 has an opposing surface 15a and a backing-side protruding portion 15b. The opposing surface 15a is placed to face the reverse surface of the workpiece W. The region other than a protruding portion 15b of the opposing surface 15a is formed flat.

The protruding portion 15b is an indenter that presses the workpiece W that has been subjected to friction stir spot welding. In a case in which the backing-side pressing tool 15 is provided in the device 1, the protruding portion 15b protrudes from the opposing surface 15a in the axis P direction, extends around the axis P, and is placed so as to be able to press the reverse surface of the workpiece W.

The protruding portion 15b is formed in an arc shape extending in the circumferential direction of the opposing surface 15a when viewed from the axis P direction. As an example, the protruding portion 15b is formed in the same shape and size as the protruding portion 10b.

The pressing tool set 11 according to the present embodiment is placed such that the protruding portions 10b and 15b are stacked on each other (perfectly stacked on each other in this case), respectively located on the rotary tool 2 side and its opposite side (backing-side pressing tool 15 side), through the workpiece W, when viewed from the axis P direction.

FIG. 3 is a flowchart showing a friction stir spot welding method according to the first embodiment. As shown in FIG. 3, in this method, a sequence including a plurality of steps S1 to S4 in the order is performed. Specifically, in alignment step S1, the rotary tool 2 is aligned with the workpiece W in order to perform friction stir spot welding at a predetermined welding position. In welding step S2 after alignment step S1, while the workpiece W is supported and pressed by the end face 8a of the clamp member 8, the workpiece W is welded with the pin member 6 and the shoulder member 7 by friction stir spot welding.

In attaching step S3, after welding step S2, the pin member 6 and the shoulder member 7 are retracted from the workpiece W, and the pressing tool set 11 is attached to the device 1. In pressing step S4 after attaching step S3, the workpiece W is pressed by the device 1. Performing this pressing step S4 will apply residual stress to the workpiece W and improve the fatigue strength of the workpiece W.

FIGS. 4(a) to 4(f) are cross-sectional views for explaining the friction stir spot welding method according to the first embodiment. First, the operator inputs setting information to the device 1 and makes the backing member 5 hold the plate materials W1 and W2 in an overlaid state. The control unit 4 controls the tool driving unit 3 so as to move the rotary tool 2 to a predetermined welding position (FIG. 4(a)). Thus, alignment step S1 is performed to align the rotary tool 2 with the workpiece W.

Next, the control unit 4 controls the tool driving unit 3 so as to rotate/drive the pin member 6 and the shoulder member 7, and also controls the tool driving unit 3 so as to cause the shoulder member 7 and the clamp member 8 to come into contact with the surface of the workpiece W. Thereafter, the control unit 4 controls the tool driving unit 3 so as to press the shoulder member 7 against the workpiece W. Accordingly, the end face 8a comes into surface contact with the surface of the workpiece W, and the shoulder member 7 is pushed into the workpiece W to frictionally stir the workpiece W (FIG. 4(b)).

At this time, the control unit 4 controls the tool driving unit 3 to move the end face of the pin member 6 which is pushed to the workpiece W to the opposite side to the pushing direction relative to the end face of the shoulder member 7 which is pushed to the workpiece W. As a result, a plastic flow portion W3 of the workpiece W generated by frictional stirring of the shoulder member 7 enters the hollow portion 7a of the shoulder member 7 (FIG. 4(b)).

Next, in a state in which the end face 8a of the clamp member 8 is in surface contact with the surface of the workpiece W, the control unit 4 controls the tool driving unit 3 to move the end faces of the pin member 6 and the shoulder member 7 which are pushed into the workpiece W side toward the surface position of the workpiece W before the pin member 6 and the shoulder member 7 come into contract with the surface of the workpiece W.

Thus, the workpiece W is subjected to friction stir spot welding while the plastic flow portion W3 of the workpiece W entering the inside of the shoulder member 7 by friction stir by the shoulder member 7 is backfilled by the pin member 6 (FIG. 4(c)).

Welding step S2 is performed as described above to perform friction stir spot welding of the workpiece W and form a circular friction-stirred region J on the workpiece W as viewed in the axis P direction (in front view) (see FIG. 5).

Next, the control unit 4 controls the tool driving unit 3 so as to separate (retract) the pin member 6, the shoulder member 7, and the clamp member 8 from the workpiece W (FIG. 4(d)). Thereafter, the operator attaches the welding-side pressing tool 10 to the rotary tool 2 and places the backing-side pressing tool 15. In this case, the backing-side pressing tool 15 is replaced with the backing member 5, but the backing-side pressing tool 15 may be placed on the backing member 5. When the backing member 5 is not used, the workpiece W may be supported by a support member (not shown).

At this time, when viewed from the axis P direction, the welding-side pressing tool 10 and the backing-side pressing tool 15 are aligned such that the protruding portions 10b and 15b overlap (completely overlap) through the workpiece W. With this operation, attaching step S3 using the pressing tool set 11 is performed.

After welding step S2 (in this case, after attaching step S3), in a state in which the pin member 6 and the shoulder member 7 are accommodated in the accommodation space of the clamp member 8, the obverse surface and the reverse surface of at least one of the friction-stirred region J of the workpiece W and the adjacent region adjacent to the friction-stirred region J of the workpiece W is pressed by the device 1 from the rotary tool 2 side and its opposite side (backing-side pressing tool 15 side).

In the present embodiment, after attaching step S3, the control unit 4 controls the tool driving unit 3 to cause the protruding portions 10b and 15b to press the obverse surface and the reverse surface of the boundary between the friction-stirred region J of the workpiece W and its adjacent region while maintaining the position of the axis P of the pin member 6 with respect to the workpiece W at the position of the axis P in welding step S2 (FIG. 4(f)).

As described above, pressing step S4 is performed, a concave portion L is formed in the portion of the workpiece W which is pressed by the protruding portion 10b, and a concave portion M is formed in the portion of the workpiece W which is pressed by the protruding portion 15b. As a result, a compression portion (compression plastic strain portion) K is formed in a region including the portion between the concave portions L and M of the workpiece W, and a residual stress is applied to the workpiece W. In the present embodiment, by using the annular protruding portions 10b and 15b viewed from the axis P direction, the entire circumference of the obverse surface and the reverse surface at the boundary between the friction-stirred region J of the workpiece W and its adjacent region is pressed at once, and the compression portion K is formed at one once on the entire circumference of the obverse and reverse surfaces at this boundary.

By performing pressing step S4 in a state in which the temperature of the friction-stirred region J is lower than the friction stir temperature, the workpiece W is cold-compressed. Thereafter, the control unit 4 controls the tool driving unit 3 so as to release the compression by the clamp member 8.

FIG. 5 is a front view of the joint portion of the workpiece W formed by the friction stir spot welding method according to the first embodiment. FIG. 6 is a cross-sectional view showing a state when a tensile load is applied from both ends of the workpiece W to the joint portion of the workpiece W formed by the friction stir spot welding method according to the first embodiment.

As shown in FIG. 5, the friction-stirred region J having a circular shape in front view is formed in the workpiece W after friction stir spot welding. On the obverse and reverse surfaces at the boundary between the friction-stirred region J and its adjacent region, the annular concave portions L and M are formed over the entire circumference of the friction-stirred region J. For example, the concave portions L and M are formed so as to completely overlap through the workpiece W in front view. The annular compression portion K is formed in a region corresponding to the concave portions L and M of the workpiece W in front view.

The workpiece W is provided with a residual stress (compressive residual stress) due to the formation of the compression portion K. This improves the fatigue strength.

In the workpiece W according to the present embodiment, the fatigue strength is improved over the entire circumference of the friction-stirred region J.

For this reason, for example, as shown in FIG. 6, when a fatigue load repeatedly applies a tensile force D1 to the first plate material W1 and the second plate material W2 of the workpiece W in the direction in which each of the plate materials W1 and W2 extends and the boundary (welding boundary) of the friction-stirred region J becomes a starting point and a propagation path of fatigue fracture, the fatigue life of the workpiece W is extended by virtue of the residual stress applied to the compression portion K.

According to the studies by the inventors of the present application, as an embodiment, when the compression portion K was formed in the region of the workpieces W which is located more inside the friction-stirred region J than the welding interface between the friction-stirred region J and its adjacent region, the inventors confirmed that the fatigue life of the joint portion was improved about 10 times.

As described above, according to the first embodiment, performing pressing step S4 after welding step S2 (after attaching step S3 in this case) can press the obverse and reverse surfaces of the workpiece W from the rotary tool 2 side and its opposite side after friction stir spot welding of the workpiece W. As a result, the workpiece W can be compressed, and a residual stress can be properly applied to the joint portion of the workpiece W. Accordingly, the fatigue strength of the joint portion of the workpiece W can be improved.

Such pressing of the workpiece W can be performed by using the device 1 used for friction stir spot welding of the workpiece W. In addition, when a plurality of friction stir spot welding operations are performed by a series of welding operations, the pressing can be performed accompanying this welding operations. Therefore, it is possible to efficiently perform the friction stir spot welding and pressing of the workpiece W by a series of operations and to suppress a decrease in productivity of welded body due to the addition of the pressing step S4.

In pressing step S4, because the surface of the workpiece W is pressed by the protruding portion 10b of the welding-side pressing tool 10 attached to the rotary tool 2 so as to cover the distal ends of the pin member 6 and the shoulder member 7, a desired region of the surface of the workpiece W can be pressed efficiently. Further, by pressing the workpiece W with the protruding portion 10b, the workpiece W can be properly compressed even with a relatively small pressing force because the pressing area can be reduced. For this reason, it is not necessary to separately prepare a dedicated device for pressing the workpiece W. Therefore, the cost and work load for improving the fatigue strength of the joint portion can be reduced, and the fatigue strength of the joint portion can be improved efficiently.

In pressing step S4, the backing-side pressing tool 15 is used, and the reverse surface of the workpiece W is pressed by the protruding portion 15b of the backing-side pressing tool 15. This makes it possible to efficiently suppress a desired region of the reverse surface of the workpiece W from the backing-side pressing tool 15 side of the workpiece W. In addition, because the workpiece W is pressed by the protruding portion 15b, the pressing area can be reduced. Accordingly, the workpiece W can be properly compressed even with a relatively small pressing force.

In pressing step S4, when viewed from the axis P direction, the workpiece W is pressed such that the pressing positions of the workpiece W on the rotary tool 2 side and its opposite side overlap through the workpiece W. Therefore, when viewed from the axis P direction, the overlapping region of the workpiece W can be pressed from both sides of the workpiece W in the axis P direction, and the fatigue strength of the region can be further improved.

Because the pressing tool set 11 includes the welding-side pressing tool 10 and the backing-side pressing tool 15, the obverse surface and the reverse surface of at least one of the friction-stirred region J of the workpiece W and the adjacent region adjacent to the friction-stirred region J of the workpiece W can be pressed from the rotary tool 2 side and the backing-side pressing tool 15 side by using the welding-side pressing tool 10 attached to the rotary tool 2 of the device 1 and the backing-side pressing tool 15. Such pressing of the workpiece W can be efficiently performed by providing the device 1 used for friction stir spot welding of the workpiece W with the pressing tool set 11.

The welding-side protruding portion (first protruding portion) 10b is placed on the end face 10a of the welding-side pressing tool 10, and the backing-side protruding portion (second protruding portion) 15b is placed on the opposing surface 15a of the backing-side pressing tool 15. This makes it possible to efficiently press the desired regions of the obverse surface and the reverse surface of the workpiece W by using the respective protruding portions 10b and 15b and to reduce the welding area. Accordingly, the workpiece W can be properly compressed even with a relatively small pressing force. The other embodiments will be described next, focusing on differences from the preceding embodiment.

Second Embodiment

FIG. 7 is a perspective view of a pressing tool set 21 according to the second embodiment. FIG. 8 is a cross-sectional view showing a state when a tensile load is applied from both ends of a workpiece W to the joint portion of the workpiece W formed by the friction stir spot welding method according to the second embodiment.

A welding-side protruding portion 20b of a welding-side pressing tool 20 is formed in an arc shape while being curved at a constant curvature in front view of an end face 20a (as viewed from the axis P direction). The length of the protruding portion 20b can be set as appropriate.

A backing-side protruding portion 25b of a backing-side pressing tool 25 is formed in an arc shape while being curved at a constant curvature in front view of an end face 25a (as viewed from the axis P direction). The length of the protruding portion 25b can be set as appropriate. The protruding portions 20b and 25b of the present embodiment are formed in the same shape and the same size.

The protruding portions 20b and 25b are positioned point-symmetrically with respect to an axis P when viewed from the axis P direction, while the pressing tool set 21 is provided in the device 1, such that a center position O1 of a circle having the arc of the protruding portion 20b as a part of the circumference in a plane parallel to the end face 20a and a center position O2 of a circle having the arc of the protruding portion 25b as a part of the circumference in a plane parallel to the end face 25a are located on the axis P.

The angle between two lines passing through both ends of the protruding portion 20b in the longitudinal direction and the center position O1 in a plane parallel to the end face 10a can be set as appropriate. For example, this angle can be set in the range of several degrees or more to several tens degrees or less (30° in this case).

The angle between two lines passing through both ends of the protruding portion 25b in the longitudinal direction and the center position O2 in a plane parallel to an opposing surface 15a can be set as appropriate. For example, this angle can be set in the range of several degrees or more to several tens degrees or less (30° in this case).

In attaching step S3 according to the second embodiment, of the friction-stirred region J in each of the pair of workpieces (the plate materials W1 and W2 in this case) that are the workpiece W and its adjacent region, the pressing tool set 21 is attached to the device 1 such that the protruding portions 20b and 25b are arranged in advance on the side to which a tensile force D1 is applied.

As shown in FIG. 8, in pressing step S4, of the friction-stirred region J in each of the pair of workpieces (the plate materials W1 and W2 in this case) and its adjacent region, concave portions L and M and a compression portion K are formed in portions to which the tensile force D1 is applied (a total of two portions of the workpiece W).

According to the second embodiment, while the compression portion K is partially formed in a partial region of the entire circumference of the friction-stirred region J of the workpiece W and its adjacent region, the required fatigue strength can be imparted to the workpiece W with respect to the tensile force D1.

Note that in the state in which the pressing tool set 21 is provided for the device 1 as described above, the protruding portions 20b and 25b may be arranged so as not to be point-symmetric with respect to the axis P when viewed from the axis P direction.

The protruding portions 20b and 25b may have different shapes. For example, one of the protruding portions 20b and 25b may be longer than the other, or may have a different height dimension from the other.

Pressing step S4 may be performed a plurality of times while the position of the pressing tool set 21 is changed with respect to the device 1 so as to form the compression portions K (concave portions L and M) at a plurality of positions in the workpiece W.

By performing pressing step S4 a plurality of times in this way, as in the first embodiment (see FIG. 5), the compression portion K that is continuous over the entire circumference of the obverse and reverse surfaces may be formed at the boundary between the friction-stirred region J of the workpiece W and its adjacent region.

Third Embodiment

FIGS. 9(a) to 9(f) are cross-sectional views for explaining a friction stir spot welding method according to the third embodiment. A device 1 according to the third embodiment includes a clamp member 18 and a backing-side pressing tool 25 as a pressing tool set.

The clamp member 18 has a clamp-side protruding portion 18c. The protruding portion 18c protrudes in the axis P direction from an end face 18a. The protruding portion 18c is an indenter that presses the workpiece W that has been subjected to friction stir spot welding. The protruding portion 18c is disposed so as to be able to press the workpiece W that has been subjected to friction stir spot welding in the axis P direction. The protruding portion 18c has a shape for applying compressive plastic strain to the welding interface, which is the load transmitting portion of the workpiece W, within the load output range required for a welding step in a normal friction stir spot welding device.

Specifically, the region other than the protruding portion 18c of the end face 18a of the clamp member 18 is formed flat. The end face 18a is formed in an annular shape when viewed from the axis P direction. The protruding portion 18c is formed in an arc shape extending in the circumferential direction of the axis P when viewed in the axis P direction. That is, the protruding portion 18c extends while being curved with a certain curvature as viewed in the axis P direction. For example, the width and height (in the axis P direction) of the protruding portion 18c are constant. Further, a cross section of the protruding portion 18c which is perpendicular to the longitudinal direction is rectangular.

The protruding portion 18c according to the present embodiment is formed in an arc shape along the peripheral edge of an inner peripheral surface 18b of the clamp member 18. The protruding portion 18c is disposed closer to the axis P than the outer edge of the end face 18a. For example, the protruding portion 18c is disposed at a position that is continuous with the inner peripheral surface 18b. The side surface of the protruding portion 18c on the axis P side is smoothly continuous with the inner peripheral surface 18b.

For example, the length dimension of the protruding portion 18c is set to a value that is ½ (half perimeter) of the entire perimeter of the peripheral edge of the inner peripheral surface 18b when viewed in the axis P direction. The length dimension of the protruding portion 18c is not limited to this, and may be equal to that of the protruding portion 20b according to the second embodiment, or may be set to the value of the entire circumference of the inner peripheral surface 18b. That is, the protruding portion 18c may have an annular shape when viewed from the axis P direction.

The height (in the axis P direction) of the protruding portion 18c can be set as appropriate. When the workpiece W is a pair of plate materials W1 and W2, the height dimension of the protruding portion 18c can be set to, for example, a value smaller than the plate thickness dimension of the plate material W1.

At least one of the width dimension and the height dimension of the protruding portion 18c may differ at a plurality of positions on the protruding portion 18c. Further, a cross section of the protruding portion 18c which is perpendicular to the longitudinal direction is not limited to a rectangular shape, and may be, for example, a parabolic shape that is convex toward the workpiece W. Further, the protruding portion 18c may be placed at a position discontinuous with the inner peripheral surface 18b. In other words, a step may be provided between the side surface of the protruding portion 18c which is located on the axis P side and the inner peripheral surface 18b.

The backing-side pressing tool 25 is the same as that according to the second embodiment. The backing-side pressing tool 25 is preferably configured such that at least part of the protruding portions 18c and 25b overlap through the workpiece W when viewed from the axis P direction in a state in which the pressing tool set is provided for the device 1. Accordingly, the protruding portions 18c and 25b according to the present embodiment have the same shape. Further, in a state in which the pressing tool set is provided for the device 1, for example, the protruding portions 18c and 25b are arranged so as to completely overlap each other through the workpiece W when viewed from the axis P direction.

In the friction stir spot welding method according to the third embodiment, in second alignment step S5 after welding step S2, a pin member 6 and a shoulder member 7 are retracted from the workpiece W and the clamp member 18 is aligned with the workpiece W to press the workpiece W at a predetermined position. In pressing step S4 after second alignment step S5, the clamp member 18 is caused to press the workpiece W at the predetermined position. Performing this pressing step S4 will apply residual stress to the workpiece W and improve the fatigue strength of the workpiece W.

Specifically, alignment step S1 (first alignment step S1) is performed in the same manner as in the first embodiment (FIG. 9(a)). Next, the control unit 4 controls the tool driving unit 3 so as to rotate/drive the pin member 6 and the shoulder member 7, and also controls the tool driving unit 3 so as to cause the shoulder member 7 and the clamp member 18 to move to a predetermined position toward the second plate material W2.

This causes the end face 18a to come into surface contact with the surface of the workpiece W and the protruding portion 18c of the clamp member 18 to press the surface of the workpiece W. As a result, a groove-shaped concave portion N is formed in the portion of the workpiece W which is pressed with the protruding portion 18c. Further, the shoulder member 7 is pushed into the workpiece W, and the workpiece W is friction-stirred (FIG. 9(b)).

As in the first embodiment, the control unit 4 controls the tool driving unit 3 to perform friction stir spot welding of the workpiece W while causing the pin member 6 to backfill the plastic flow portion W3 of the workpiece W entering the inside of the shoulder member 7 by friction stir by the shoulder member 7 (FIG. 9(c)).

Welding step S2 is performed as described above to perform friction stir spot welding of the workpiece W and form a circular friction-stirred region J on the workpiece W as viewed in the axis P direction (in front view). In welding step S2 according to the present embodiment, the friction stir spot welding is performed in a state in which the protruding portion 18c is positioned at a retraction position different from the pressing position where the protruding portion 18c presses the surface of the workpiece W in pressing step S4.

Next, the control unit 4 controls the tool driving unit 3 so as to separate (retract) the pin member 6, the shoulder member 7, and the clamp member 18 from the workpiece W (FIG. 9(d)). Thereafter, the operator replaces the backing member 5 with the backing-side pressing tool 15. The control unit 4 controls the tool driving unit 3 so as to align the rotary tool 2 by moving the axis P position of the pin member 6 with respect to the workpiece W along the surface of the workpiece W from a position X1 at the time of friction stir spot welding to a position X2 shifted by a predetermined distance. The position X2 is set to a position that overlaps the friction-stirred region J in the present embodiment.

The control unit 4 controls the tool driving unit 3 to set the position of the protruding portion 18c around the axis P such that the center of the protruding portion 18c in the longitudinal direction is located at the peripheral edge of the friction-stirred region J adjacent to the concave portion N at the position X2 and the protruding portion 18c extends in the circumferential direction of the friction-stirred region J. Further, the operator aligns the backing-side pressing tool 15 at a position where the protruding portions 18c and 25b overlap (as an example, completely overlap) as viewed from the axis P direction (FIG. 9(e)). With this operation, second alignment step S5 is performed.

In second alignment step S5, the clamp member 18 is aligned so as to be able to press the surface of the workpiece W in a region where at least part of the protruding portion 18c does not overlap the concave portion N in order to form a concave portion Q in the peripheral edge of the friction-stirred region J on the rotary tool 2 side of the workpiece W in pressing step S4.

Next, after welding step S2, while the pin member 6 and the shoulder member 7 are separated from the workpiece W, the obverse and reverse surfaces of at least the friction-stirred region J formed in welding step S2 for the workpiece W or an adjacent region adjacent to the friction-stirred region J is pressed with the protruding portions 18c and 25b.

In the present embodiment, after second alignment step S5, the control unit 4 controls the tool driving unit 3 so as to cause the protruding portion 18c to press the surface of the friction-stirred region J of the workpiece W which is located on the rotary tool 2 side while the axis P position of the pin member 6 with respect to the workpiece W is aligned with the position X2 (FIG. 9(f)). With this operation, the obverse and reverse surfaces of the workpiece W are pressed with the protruding portions 18c and 25b with the protruding portion 18c being moved from the retraction position to the pressing position.

As described above, pressing step S4 is performed, and the concave portion Q is formed in the workpiece W on the rotary tool 2 side, and the concave portion R is formed in the workpiece W on the opposite side to the rotary tool 2. As a result, a compression portion K is formed in the workpiece W, and a residual stress is applied.

By performing pressing step S4 in a state in which the temperature of the friction-stirred region J is lower than the friction stir temperature, the workpiece W is cold-compressed. Thereafter, the control unit 4 controls the tool driving unit 3 so as to release the compression by the protruding portions 18c and 25b.

According to the third embodiment, a desired region of the surface of the workpiece W can be efficiently pressed by using the protruding portion 18c. Further, by pressing the workpiece W by the protruding portion 18c, the workpiece W can be properly compressed with a relatively small pressing force because the pressing area can be reduced. For this reason, it is not necessary to separately prepare a dedicated device for pressing the workpiece W.

Therefore, the cost and work load for improving the fatigue strength of the joint portion can be reduced, and the fatigue strength of the joint portion can be improved efficiently. Such pressing of the workpiece W can be performed by providing the device 1 used for friction stir spot welding of the workpiece W with the pressing tool set, and hence can be quickly performed.

Fourth Embodiment

FIGS. 10(a) to 10(f) are cross-sectional views for explaining the friction stir spot welding method according to the fourth embodiment. A device 1 according to the fourth embodiment includes a clamp member 28 and a backing-side pressing tool 35 as a pressing tool set.

The clamp member 28 is a cylindrical member and includes an inner peripheral surface 28b, an end face 28a, and a chamber portion 28d (see FIG. 10(a)). The inner peripheral surface 28b surrounds the outer periphery of the shoulder member 7 to form an accommodation space for the shoulder member 7. The end face (abutment surface) 28a has an annular shape when viewed from the axis P direction, and comes into surface contact with the surface of the workpiece W (a first plate material W1 in this case) to press the surface. While the clamp member 28 is provided for the device 1, the end face 28a extends parallel to a plane perpendicular to the axis P direction.

The chamber portion 28d is interposed between the inner peripheral surface 28b and the end face 28a, is recessed more in the diameter-increasing direction than the inner peripheral surface 28b, and opens to the workpiece W side. The chamber portion 28d is provided at the end portion of the clamp member 28 which is located on the workpiece W side (the distal end portion in the axis P direction) and opens to the workpiece W side. That is, the chamber portion 28d opens at the distal end side of the clamp member 28 in the axis P direction and is recessed inward of the clamp member 28 in the axis P direction. The chamber portion 28d is used for forming a build-up portion W4 (see FIG. 10(d)) on the workpiece W.

The inner surface of the chamber portion 28d of the present embodiment is formed as an inclined surface that is inclined such that the inner diameter of the clamp member 28 gradually decreases from the radially inner peripheral edge of the end face 28a toward the inside of the clamp member 28 in the axis P direction. An opening of the accommodation space is formed in the radial center of the end face 28a of this inner surface.

The inclined surface (inner surface) of the chamber portion 28d of the present embodiment extends in a curved shape when viewed in a direction perpendicular to the axis P direction of the clamp member 28. For example, the inclined surface extends in an arc shape from the radially inner peripheral edge of the end face 28a when viewed in a direction perpendicular to the axis P direction, and then extends perpendicularly to the axis P direction toward the axis P. The inclined surface may extend linearly from the radially inner peripheral edge of the end face 28a toward the axis P direction when viewed in a direction perpendicular to the axis P direction.

In addition, in the present embodiment, the shape of the pair of inclined surfaces located on both sides of the axis P when viewed in a direction perpendicular to the axis P direction is symmetrical throughout the entire circumference of the clamp member 28 around the axis P. However, this is not exhaustive.

The shape of the pair of inclined surfaces may be asymmetric when viewed in one direction perpendicular to the axis P direction. In this case, for example, the shape of one of the pair of inclined surfaces may be a shape that extends longer in a direction perpendicular to the axis P than the other inclined surface.

Further, in this case, of the pair of inclined surfaces, the shape of the inclined surface on the side where a compression portion K (see FIG. 10(f)) to be described later is expected to be formed may extend longer in a direction perpendicular to the axis P compared to the other inclined surface. This makes it possible to form the compression portion K in the relatively wide region of the build-up portion W4.

The accommodation space is provided more inwardly in the axis P direction than the chamber portion 28d of the clamp member 28. When the workpiece W is not subjected to friction stir spot welding, the shoulder member 7 is accommodated in the accommodation space with the outer periphery of the shoulder member 7 surrounded. The inner peripheral surface 28b that forms the accommodation space extends in the axis P direction inside the clamp member 28. The pin member 6 is also accommodated in the accommodation space independently of the shoulder member 7. When the pin member 6 and the shoulder member 7 are accommodated in the accommodation space, the opening of the accommodation space is closed by the pin member 6 and the shoulder member 7. When the workpiece W is subjected to friction stir spot welding, the pin member 6 and the shoulder member 7 extend from the accommodation space to the workpiece W side through the chamber portion 28d.

The backing-side pressing tool 35 has an end face 35b and a concave portion 35a surrounded by the end face 35b and recessed in the axis P direction (see FIG. 10(e)). The end face 35b and the bottom surface of the concave portion 35a are opposing surfaces opposing the workpiece W.

The end face 35b has an annular shape when viewed from the axis P direction, and comes into surface contact with the reverse surface of the workpiece W (plate surface of the first plate material W1 in this case) to press the reverse surface. The end face 35b is a support surface of the backing-side pressing tool 35 which supports the workpiece W. While the backing-side pressing tool 35 is provided for the device 1, the end face 35b extends parallel to a plane perpendicular to the axis P direction.

The concave portion 35a is placed at a position facing a chamber portion 28d with the workpiece W interposed between them, and extends along the reverse surface of the workpiece W. For example, the concave portion 35a has a circular shape when viewed from the axis P direction. The concave portion 35a has an inclined surface whose inner diameter gradually decreases from the peripheral edge toward the inside of the backing-side pressing tool 35 in the axis P direction and a bottom surface surrounded by the inclined surface. The inner diameter of the peripheral edge of the concave portion 35a can be set as appropriate, and is set larger than the outer diameter of the shoulder member 7 in this case. For example, when viewed from a direction perpendicular to the axis P, the chamber portion 28d and the concave portion 35a are formed in the same shape and size.

In this case, each of the inner diameters of the openings formed by the chamber portion 28d and the concave portion 35a is larger than the inner diameter of the opening of the accommodation space (the outer diameter of the shoulder member 7). Therefore, when the workpiece W is welded by friction stir spot welding in the fourth embodiment, the build-up portion W4 formed by the chamber portion 28d is provided with a welding interface between a friction-stirred region J generated by friction stir using the pin member 6 and the shoulder member 7 and an adjacent region adjacent to the region J.

In the friction stir spot welding method according to the fourth embodiment, in alignment step S1 (to be referred to as first alignment step S1 hereinafter), the rotary tool 2 is aligned with respect to the workpiece W in order to perform friction stir spot welding at a predetermined welding position. In welding step S2 after first alignment step S1, the pin member 6 and the shoulder member 7 are pushed into the workpiece W while being rotated at the welding position, and the workpiece W is welded by friction stir spot welding. In addition, in welding step S2, the build-up portion W4 is formed on the workpiece W by filling the chamber portion 28d with part of the workpiece W.

Further, in second alignment step S5 after welding step S2, the pin member 6 and the shoulder member 7 are retracted from the workpiece W and the clamp member 28 is aligned with respect to the workpiece W to press the workpiece W at a predetermined pressing position on the surface of the build-up portion W4. In pressing step S4 after second alignment step S5, the end face 28a of the clamp member 28 is caused to press the build-up portion W4 at the pressing position, and the end face 35b of the backing-side pressing tool 35 is caused to press the portion of the workpiece W which is located on the opposite side to the build-up portion W4.

Performing this pressing step S4 will compress the build-up portion W4 of the workpiece W and the portion of the workpiece W which is located on the opposite side to the build-up portion W4 and apply the residual stress to them, thereby improving the fatigue strength of the workpiece W.

Specifically, the operator inputs setting information to the device 1 and makes the backing member 5 hold the plate materials W1 and W2 in an overlaid state. The control unit 4 controls the tool driving unit 3 so as to match the outer peripheral edge of the end face of the shoulder member 7 which is pushed into the workpiece W with the inner peripheral edge of the inclined surface of the chamber portion 28d and to match the outer peripheral edge of the end face of the pin member 6 which is pushed into the workpiece W with the inner peripheral edge of the end face of the shoulder member 7 which is pushed into the workpiece W.

The control unit 4 controls the tool driving unit 3 so as to move the rotary tool 2 to a predetermined welding position (FIG. 10(a)). Thus, first alignment step S1 is performed to align the rotary tool 2 with the workpiece W.

Next, the control unit 4 controls the tool driving unit 3 so as to rotate/drive the pin member 6 and the shoulder member 7, and also controls the tool driving unit 3 so as to cause the shoulder member 7 and the clamp member 28 to move to a predetermined position toward the second plate material W2.

With this operation, in a state in which the surface of the workpiece W is pressed with the end face 28a, the workpiece W is friction-stirred by the pin member 6 and the shoulder member 7, and at least one of the pin member 6 and the shoulder member 7 (both in this case, including the state shown in FIG. 10(c)) is pushed into (plunged) into the plastic flow portion W3 of the workpiece W, so that a portion of the workpiece W being softened is filled in the chamber portion 28d to form the build-up portion W4 on the workpiece W (FIGS. 10(b) and 10(c)).

The build-up portion W4 includes a plastic flow portion W3 of the workpiece W which is generated by friction stir by the pin member 6 and the shoulder member 7 and a softened portion of the workpiece W which is softened accompanying the generation of the plastic flow portion W3.

At this time, the control unit 4 controls the tool driving unit 3 to move the end face of the pin member 6 which is pushed to the workpiece W to the opposite side to the pushing direction relative to the end face of the shoulder member 7 which is pushed to the workpiece W. As a result, a plastic flow portion W3 of the workpiece W enters the hollow portion 7a of the shoulder member 7.

Next, in a state in which the end face 28a of the clamp member 28 is in surface contact with the surface of the workpiece W, the control unit 4 controls the tool driving unit 3 to move the end faces of the pin member 6 and the shoulder member 7 which are located on the side to be pushed into the workpiece W toward the surface position of the workpiece W before the pin member 6 and the shoulder member 7 come into contract with the surface of the workpiece W (FIG. 10(c)).

As a result, the shoulder member 7 is retracted into the accommodation space while the plastic flow portion W3 of the workpiece W that has entered the inside of the shoulder member 7 is backfilled by the pin member 6. In the fourth embodiment, the control unit 4 controls the tool driving unit 3 so as to position the end face of the pin member 6 which is pushed into the workpiece W side more inwardly in the workpiece W than the surface (top surface) of the build-up portion W4 in consideration of the volume of the build-up portion W4.

Welding step S2 is performed as described above, and the workpiece W is subjected to friction stir spot welding, so that the friction-stirred region J is formed in the build-up portion W4. A concave portion S is formed by the pin member 6 in the center of the friction-stirred region J (see FIG. 10(d)).

Next, the control unit 4 controls the tool driving unit 3 so as to separate (retract) the pin member 6, the shoulder member 7, and the clamp member 28 from the workpiece W (FIG. 10(d)). Thereafter, the operator replaces the backing member 5 with the backing-side pressing tool 35.

Next, the end face 28a is placed to face the surface of at least one (both in this case) of the friction-stirred region J of the workpiece W and the region adjacent to the friction-stirred region J of the workpiece W.

Specifically, the control unit 4 controls the tool driving unit 3 so as to align the rotary tool 2 by moving the axis P position of the pin member 6 with respect to the workpiece W along the surface of the workpiece W from a position X1 at the time of friction stir spot welding to a position X2 shifted by a predetermined distance. The operator also aligns the backing-side pressing tool 35 such that the end faces 28a and 35b overlap in the axis P direction (for example, completely overlap) through the workpiece W ((FIG. 10(e)).

As described above, second alignment step S5 is performed such that the end face 28a is aligned so as to face the top face of the build-up portion W4, and the end face 35b is aligned to face the portion of the workpiece W which is located on the opposite side to the build-up portion W4 of the workpiece W.

In the present embodiment, the position X2 is set to a position at which the friction-stirred region J and the end face 28a overlap when viewed from the axis P direction. For example, when the end face 28a comes into contact with the top surface of the build-up portion W4 at the position X2, the end face 28a comes into surface contact with each peripheral edge of the friction-stirred region J and the adjacent region adjacent to the region J, and also comes into surface contact with a region extending in the circumferential direction of the friction-stirred region J.

At the position at which the end faces 28a and 35b overlap the top portion of the build-up portion W4 in the axis P direction, the end faces 28a and 35b are set so as to be able to press the obverse and reverse surfaces of the workpiece W to form the compression portion K over the friction-stirred region J and the adjacent region adjacent to the region J.

Next, in a state in which the pin member 6 and the shoulder member 7 are retracted in the accommodation space of the clamp member 28, the obverse surface of at least one (both in this case) of the region J of the build-up portion W4 which is friction-stirred by the shoulder member 7 and the region of the build-up portion W4 which is adjacent to the friction-stirred region J is pressed with the end face 28a, and the reverse surface of the workpiece W which is located on the opposite side to the rotary tool 2 is pressed with the end face 35b.

In the present embodiment, after second alignment step S5, the control unit 4 controls the tool driving unit 3 so as to cause the end face 28a to press the surface of the friction-stirred region J of the build-up portion W4 and the surface of the adjacent region adjacent to the region J while the axis P position of the pin member 6 with respect to the workpiece W is aligned with the position X2 and to cause the end face 35b to press the reverse surface of the workpiece W which is located on the opposite side to the rotary tool 2 (FIG. 10(f)).

As described above, pressing step S4 is performed to form a compression portion (compression plastic strain portion) K on the build-up portion W4 of the workpiece W and apply residual stress to the workpiece W. In pressing step S4, the obverse and reverse surfaces of the workpiece W are pressed with the end face 28a and 35b while avoiding contact between the region surrounding the build-up portion W4 of the workpiece W and the end face 28a.

By performing pressing step S4 in a state in which the temperature of the friction-stirred region J is lower than the friction stir temperature, the workpiece W is cold-compressed. Thereafter, the control unit 4 controls the tool driving unit 3 so as to release the pressing by the clamp member 28.

According to the fourth embodiment, it is possible to locally impart residual stress to the joint portion of the workpiece W and to improve the fatigue strength of the joint section of the workpiece W. It is possible to increase the welding interface located between the friction-stirred region J and the adjacent region adjacent to the region J while suppressing an increase in the weight of the workpiece W and to further improve the rigidity of the joint portion of the workpiece W by forming the compression portion K at the welding interface.

As described above, in the fourth embodiment, in pressing step S4, the obverse surface and the reverse surface of the workpiece W are pressed by the end face 28a of the clamp member 28 and the end face 35b of the backing-side pressing tool 35, so that the workpiece W can be efficiently pressed by the end face 28a of the clamp member 28 and the end face 35b of the backing-side pressing tool 35.

By using the pressing tool set of the fourth embodiment, the obverse surface and the reverse surface of at least one of the friction-stirred region J of the workpiece W and the adjacent region adjacent to the friction-stirred region J of the workpiece W can be pressed from the rotary tool 2 side and the backing-side pressing tool 25 side.

Fifth Embodiment

FIGS. 11(a) to 11(f) are cross-sectional views for explaining a friction stir spot welding method according to the fifth embodiment. As a difference from the fourth embodiment, in welding step S2 in the friction stir spot welding method according to the fifth embodiment, an additional material W5 is welded to the workpiece W by friction stir spot welding while the workpiece W is supported by the backing-side pressing tool 35, and the additional material W5 that can be mixed to the workpiece W by friction-stirring is supplied into the concave portion 35a (FIG. 11(a)). In this case, for example, the friction stir spot welding of plate materials W1 and W2 of the workpiece W is performed simultaneously with that of the additional material W5 (FIGS. 11(b) and 11(c)).

As a result, the additional material W5 is integrated with the workpiece W while being molded using the concave portion 35a as a mold. Therefore, the thickness dimension of the build-up portion W4 formed in the fifth embodiment is increased more than the thickness dimension of the build-up portion W4 formed in the fourth embodiment. After the rotary tool 2 is separated from the workpiece W upon friction stir spot welding of the workpiece W (FIG. 11(d)), in pressing step S4, the build-up portion W4 is pressed by the end faces 28a and 35b from both sides of the workpiece W in the axis P direction to form a compression portion K in the build-up portion W4 (FIGS. 11(e) and 11(f)).

As described above, according to the friction stir spot welding method of the fifth embodiment, the thickness dimension of the build-up portion W4 can be further increased by using the additional material W5 supplied to the concave portion 35a of the backing-side pressing tool 35. Accordingly, it is possible to further increase the welding interface located between the friction-stirred region J and the adjacent region adjacent to the region J while suppressing an increase in the weight of the workpiece W and to further improve the rigidity of the joint portion of the workpiece W by forming the compression portion K at the welding interface as compared with the fourth embodiment.

The material characteristics of the additional material W5 can be added to the workpiece W by setting different materials for the workpiece W and the additional material W5 before the friction stir mixing. Accordingly, the fatigue strength of the build-up portion W4 can be improved, and the degree of freedom in designing the characteristics of the workpiece W after the friction stir spot welding can be increased.

The shape of the additional material W5 can be set as appropriate. The additional material W5 is not limited to a plate shape, and may be, for example, a block shape or a powder shape. Further, in welding step S2 of the fifth embodiment, it is not necessary to perform the friction stir spot welding of the plate materials W1 and W2 of the workpiece W simultaneously with that of the additional material W5. For example, the additional material W5 may be welded to the workpiece W by friction stir spot welding after the friction stir spot welding of the plate materials W1 and W2 of the workpiece W.

Sixth Embodiment

FIG. 12 is a cross-sectional view for explaining the friction stir spot welding method according to the sixth embodiment. FIG. 12 shows the state of pressing step S4. A device 1 according to the sixth embodiment includes a welding-side pressing tool 30 and a backing-side pressing tool 45 as a pressing tool set.

The welding-side pressing tool 30 has an end face 30a and a chamber portion 30d. The end face 30a (contact surface) has the same shape as an end face 28a of a clamp member 28 according to the fourth embodiment.

That is, in a state in which the welding-side pressing tool 30 is provided for the device 1, the end face 30a has an annular shape when viewed from the axis P direction and is placed to face the surface of a workpiece W (the plate surface of a first plate material W1 in this case). The end face 30a extends parallel to a plane perpendicular to the axis P direction. The end face 30a is placed so as to be able to press the surface of the workpiece W. The end face 30a is placed to face the surface of at least one (both in this case) of the friction-stirred region J of the workpiece W and the region adjacent to the friction-stirred region J of the workpiece W.

The chamber portion 30d is provided at an end (the distal end portion in the axis P direction) of the welding-side pressing tool 30 which is located on the workpiece W in a state in which the welding-side pressing tool 30 is provided for the device 1 and opens on the workpiece W side. That is, the chamber portion 30d opens at the distal end side of the welding-side pressing tool 30 in the axis P direction and is recessed inward of the welding-side pressing tool 30 in the axis P direction.

The inner surface of the chamber portion 30d is formed as an inclined surface that is inclined such that the inner diameter of the welding-side pressing tool 30 gradually decreases from the radially inner peripheral edge of the end face 30a toward the inside of the chamber portion 30d in the axis P direction.

The backing-side pressing tool 45 has the same configuration as the backing-side pressing tool 35 according to the fourth and fifth embodiments except for the area of the end face 45b. As an example, the end face 45b has the same area as the end face 30a, but may have a different area.

In the sixth embodiment, in welding step S2, similarly to the first embodiment, the friction-stirred region J is formed in the workpiece W (see FIGS. 4(c) and 4(d)). Thereafter, in attachment step S3, the welding-side pressing tool 30 is attached to the rotary tool 2, and the backing-side pressing tool 45 is placed on the opposite side of the workpiece W to the rotary tool 2. The end faces 30a and 45b according to the present embodiment are arranged at positions to overlap (completely overlap in this case) through the workpiece W when viewed from the axis P direction.

In pressing step S4, the obverse and reverse surfaces of the workpiece W are pressed by the end faces 30a and 45b. As a result, the compression portion K is formed over the entire circumference of the friction-stirred region J of the workpiece W and its adjacent region. In the sixth embodiment, because the pressing force of the device 1 can be concentrated on the end faces 30a and 45b, the workpiece W can be properly compressed even with a relatively small pressing force from the rotary tool 2 side of the workpiece W and its opposite side.

In the sixth embodiment, as in the fifth embodiment, a build-up portion may be formed on the opposite side of the workpiece W to the rotary tool 2 by supplying an additional material W5 to the concave portion 45a of the backing-side pressing tool 45.

The present invention is not limited to each embodiment described above, and the configuration or method thereof can be changed, added, or deleted without departing from the spirit of the present invention. Obviously, the workpiece W is not limited to the pair of plate materials W1, W2. The workpiece W may be a component of a vehicle such as an aircraft, an automobile, or a railway vehicle, or may be a component of a building.

INDUSTRIAL APPLICABILITY

The present invention can efficiently improve the fatigue strength of the joint portion of a workpiece formed by refill friction stir spot welding, and hence can be used widely in various fields using refill friction stir spot welding.

REFERENCE SIGNS LIST

J friction-stirred region
P axis
W workpiece
1 refill friction stir spot welding device
2 rotary tool
6 pin member
7 shoulder member
8, 18, 28 clamp member
8a, 18a, 28a end surface of clamp member
8b inner peripheral surface of clamp member
18c clamp-side protruding portion (first protruding portion)
10, 20, 30 welding-side pressing tool
10a, 20a, 30a end face of welding-side pressing tool
10b, 20b welding-side protruding portion (first protruding portion)
11, 21 pressing tool set
15, 25, 35, 45 backing-side pressing tool
15a opposing surface
25a, 35b, 45b end face of backing-side pressing tool (opposing surface)
15b, 25b backing-side protruding portion (second protruding portion)

The invention claimed is:

1. A friction stir spot welding method of welding a workpiece by friction stir spot welding using a friction stir spot welding device including a rotary tool that partially stirs the workpiece and a clamp member that presses the workpiece,
the rotary tool including a pin member that rotates around a predetermined axis and is provided so as to be able to advance and retract in a direction of the axis and a shoulder member that rotates around the axis while surrounding an outer periphery of the pin member and is provided so as to be able to advance and retract in the direction of the axis independently of the pin member, and
the clamp member having an inner peripheral surface that forms an accommodation space for the pin member and the shoulder member so as to surround an outer periphery of the shoulder member and an annular end face configured to come into surface contact with the workpiece, the friction stir spot welding method comprising:
a welding step of performing friction stir spot welding of the workpiece by using the pin member and the shoulder member while the workpiece is supported and pressed by the end face of the clamp member; and
a pressing step of causing the friction stir spot welding device to press an obverse surface and a reverse surface of at least one of a friction-stirred region of the workpiece having undergone friction stir spot welding and an adjacent region adjacent to the friction-stirred region of the workpiece from a rotary tool side and an opposite side to the rotary tool after the welding step while the pin member and the shoulder member are accommodated in the accommodation space.

2. The friction stir spot welding method according to claim 1, wherein
in the pressing step, a welding-side pressing tool having an end face capable of pressing the surface of the workpiece is attached to the rotary tool so as to cover distal ends of the pin member and the shoulder member, and
the end face of the welding-side pressing tool presses the surface of the workpiece.

3. The friction stir spot welding method according to claim 1, wherein
in the pressing step, a welding-side pressing tool having an end face capable of pressing the surface of the workpiece is attached to the rotary tool so as to cover distal ends of the pin member and the shoulder member,
the welding-side pressing tool has the end face placed to face the surface of the workpiece and a welding-side protruding portion that protrudes in the direction of the axis from the end face of the welding-side pressing tool, extends around the axis, and is placed to be able to press the surface of the workpiece, and
in the pressing step, the surface of the workpiece is pressed by the welding-side protruding portion.

4. The friction stir spot welding method according to claim 1, wherein in the pressing step, the surface of the workpiece is pressed by the end face of the clamp member.

5. The friction stir spot welding method according to claim 1, wherein the clamp member has a clamp-side protruding portion that protrudes in the direction of the axis from the end face of the clamp member, extends around the axis, and is placed to be able to press the workpiece, and in the pressing step, the surface of the workpiece is pressed by the clamp-side protruding portion.

6. The friction stir spot welding method according to claim 1, wherein
the pressing step is performed using a backing-side pressing tool,
the backing-side pressing tool includes: an opposing surface that is placed on an opposite side of the workpiece to the rotary tool and faces the reverse surface of the workpiece; and a backing-side protruding portion that protrudes in the direction of the axis from the opposing surface, extends around the axis, and is placed so as to be able to press the reverse surface of the workpiece, and
the reverse surface of the workpiece is pressed with the backing-side protruding portion.

7. The friction stir spot welding method according to claim 1, wherein in the pressing step, the workpiece is pressed such that pressing positions on the workpiece on the rotary tool side and the opposite side to the rotary tool overlap through the workpiece when viewed from the direction of the axis.

8. A pressing tool set that is provided for a friction stir spot welding device configured to partially stir and spot-weld a workpiece by using a rotary tool including a pin member that rotates around a predetermined axis and is provided so as to be able to advance and retract in a direction of the axis and a shoulder member that rotates around the axis while surrounding an outer periphery of the pin member and is provided so as to be able to advance and retract in the direction of the axis independently of the pin member, the pressing tool set being configured to press the workpiece having undergone friction stir spot welding, the pressing tool set comprising:
a welding-side pressing tool that is attached to the rotary tool so as to cover distal ends of the pin member and the shoulder member and has an end face placed to face a surface of at least one of a friction-stirred region of the workpiece and an adjacent region adjacent to the friction-stirred region of the workpiece; and
a backing-side pressing tool that is placed on an opposite side of the workpiece to the rotary tool to support the workpiece and has an opposing surface placed to face a reverse surface of the workpiece.

9. The pressing tool set according to claim 8, wherein
the end face has a first protruding portion protruding in the direction of the axis from the end face, extending around the axis, and placed to be able to press an obverse surface of the workpiece, and
the opposing surface has a second protruding portion protruding in the direction of the axis from the opposing surface, extending around the axis, and placed to be able to press the reverse surface of the workpiece.

10. A refill friction stir spot welding device comprising the backing-side pressing tool described in the pressing tool set defined in claim 8.

11. A pressing tool set that is provided for a friction stir spot welding device configured to partially stir and spot-weld a workpiece by using a rotary tool including a pin member that rotates around a predetermined axis and is provided so as to be able to advance and retract in a direction of the axis and a shoulder member that rotates around the axis while surrounding an outer periphery of the pin member and is provided so as to be able to advance and retract in the direction of the axis independently of the pin member, the pressing tool set being configured to press the workpiece having undergone friction stir spot welding, the pressing tool set comprising:
a clamp member having an inner peripheral surface that forms an accommodation space for the pin member and the shoulder member so as to surround an outer periphery of the shoulder member and an annular end face placed to face a surface of at least one of a friction-stirred region of the workpiece and an adjacent region adjacent to the friction-stirred region of the workpiece, wherein the end face is pressed against the workpiece having undergone friction stir spot welding; and
a backing-side pressing tool that is placed on an opposite side of the workpiece to the rotary tool to support the workpiece and has an opposing surface placed to face a reverse surface of the workpiece, wherein
the end face has a first protruding portion protruding in the direction of the axis from the end face, extending around the axis, and placed to be able to press an obverse surface of the workpiece, and
the opposing surface has a second protruding portion protruding in the direction of the axis from the opposing surface, extending around the axis, and placed to be able to press the reverse surface of the workpiece.

12. A refill friction stir spot welding device comprising:
a rotary tool including a pin member that rotates around a predetermined axis and is provided so as to be able to advance and retract in a direction of the axis and a shoulder member that rotates around the axis while surrounding an outer periphery of the pin member and is provided so as to be able to advance and retract in the direction of the axis independently of the pin member;
a clamp member having an inner peripheral surface that forms an accommodation space for the pin member and the shoulder member so as to surround an outer periphery of the shoulder member and an annular end face placed to face a surface of at least one of a friction-stirred region of a workpiece and an adjacent region adjacent to the friction-stirred region of the workpiece, wherein the end face is pressed against the workpiece having undergone friction stir spot welding;
a backing-side pressing tool that is placed on an opposite side of the workpiece to the rotary tool to support the workpiece and has an opposing surface placed to face a reverse surface of the workpiece;
a tool driving unit configured to rotationally drive the rotary tool; and
a control unit configured to control the tool driving unit, wherein
the control unit includes a processor and a storage medium readable by the processor, the storage medium storing a control program which executes:
a welding step in which the processor controls the tool driving unit to perform friction stir spot welding of the workpiece by using the pin member and the shoulder member while the workpiece is supported by the backing-side pressing tool and pressed by the end face of the clamp member; and
a pressing step in which the processor controls the tool driving unit to cause the opposing surface of the backing-side pressing tool and the end face of the clamp member to press an obverse surface and a reverse surface of at least one of the friction-stirred region of the workpiece having undergone friction stir spot welding and the adjacent region adjacent to the friction-stirred region of the workpiece from a rotary tool side and an opposite side to the rotary tool after the welding step while the pin member and the shoulder member are accommodated in the accommodation space.

\* \* \* \* \*